June 24, 1930. F. D. HARDESTY 1,768,518
CONTROLLING MECHANISM
Filed Feb. 2, 1925 5 Sheets-Sheet 1

Inventor:
F. D. Hardesty.
By Blackmore, Spencer & Flint
his Attorneys.

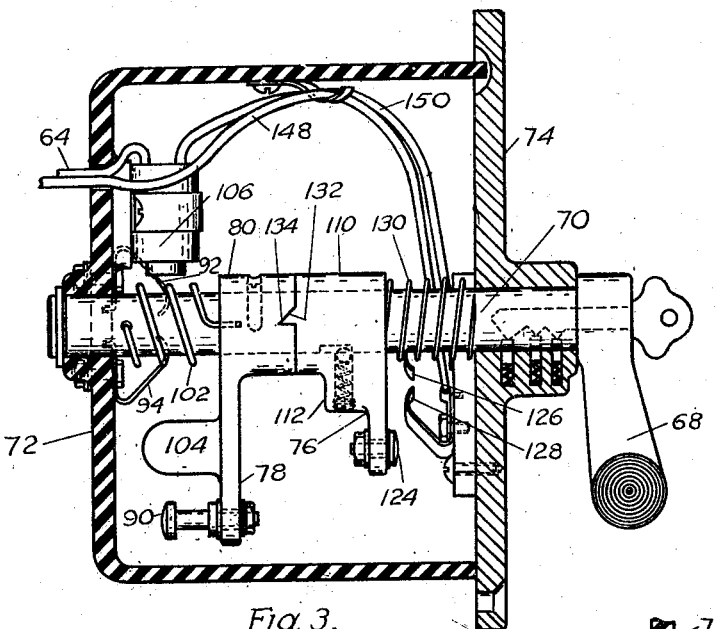
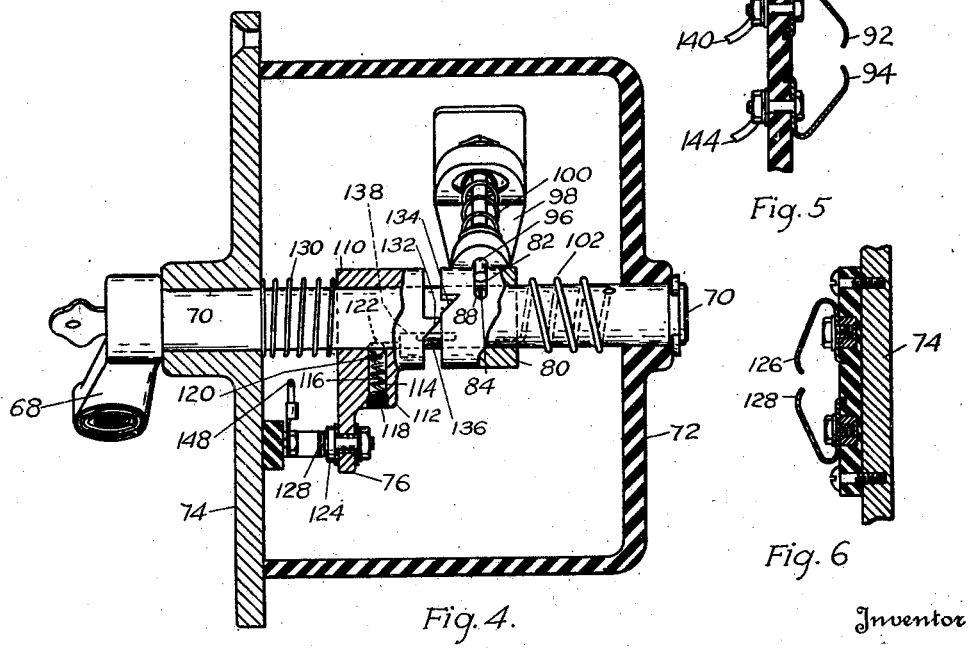
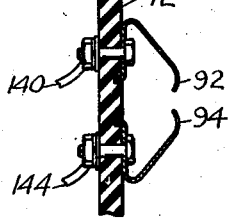
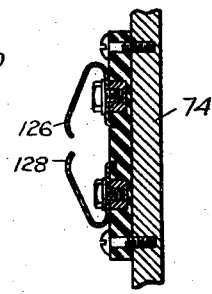

June 24, 1930. F. D. HARDESTY 1,768,518
CONTROLLING MECHANISM
Filed Feb. 2, 1925 5 Sheets-Sheet 3

Inventor:
F. D. Hardesty.
By Blackmore, Spencer & Flint
his Attorneys.

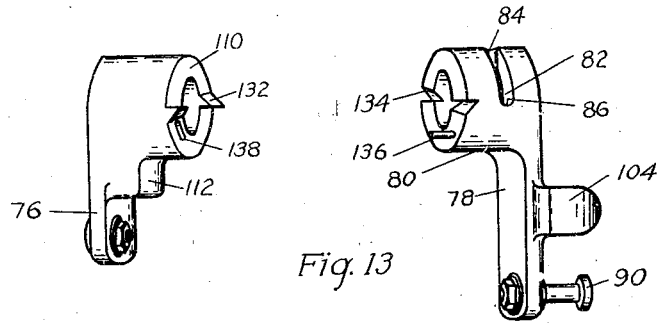
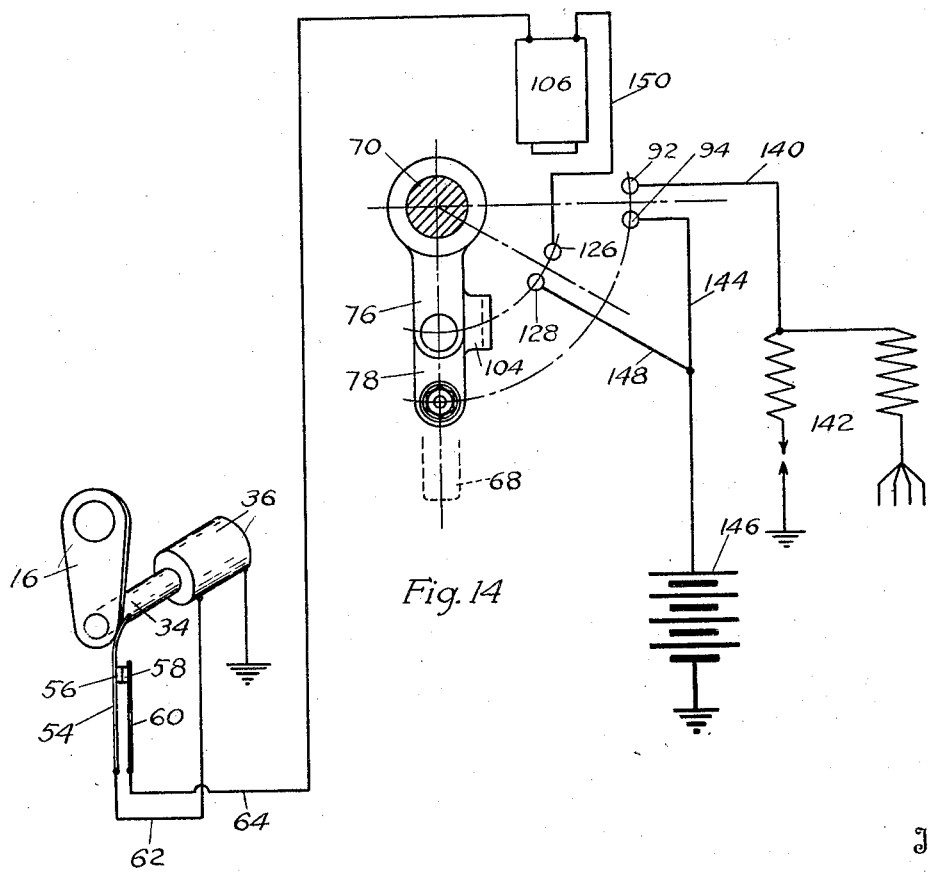

June 24, 1930.  F. D. HARDESTY  1,768,518
CONTROLLING MECHANISM
Filed Feb. 2, 1925   5 Sheets-Sheet 5

Inventor:
F. D. Hardesty.
By Blackmore, Spencer & Flint
his Attorneys

Patented June 24, 1930

1,768,518

UNITED STATES PATENT OFFICE

FRANCIS D. HARDESTY, OF BIRMINGHAM, MICHIGAN

CONTROLLING MECHANISM

Application filed February 2, 1925. Serial No. 6,347.

This invention relates to controlling mechanism and is herein shown as embodied in mechanism for preventing the stopping of a motor vehicle engine with the gear shift lever out of neutral position and for automatically locking the gear shift lever.

In my prior application Serial No. 647,438, filed June 25, 1923, I have shown mechanism for automatically locking a gear shift lever when the lever is moved to neutral position and the ignition switch is turned to its off position. In this construction and in motor vehicles generally, it is possible to shut off the motor and leave the shift lever in gear and unlocked with the consequent likelihood of a subsequent inadvertent attempt to restart the motor while in gear.

Accordingly, an object of the invention is to provide mechanism for preventing the stopping of the motor when in gear. Another object is to provide mechanism to insure the locking of the gear shift lever or similar control element when the ignition switch actuating member is moved to its off position. In the illustrated construction, these objects are secured by automatically maintaining the ignition circuit closed if the gear shift lever is not moved to neutral position. The continued running of the motor reminds the operator that he must move the gear shift lever to neutral and that merely throwing the switch actuating member to its off position does not stop the motor. With the shift lever in neutral position, the lever becomes locked without further voluntary acts.

To these ends and also to improve generally upon devices of the character indicated my invention consists in the various matters hereinafter described and claimed.

In the drawings, Figure 1 is a front view of the ignition switch and its housing.

Figure 3 is a vertical section on line 3—3 of Figure 1 looking in the direction of the arrows.

Figure 4 is a section on the line 4—4 of Figure 2.

Figure 5 is a section on the line 5—5 of Figure 1.

Figure 6 is a section on the line 6—6 of Figure 2.

Figure 12 is a detail view of one switch arm.

Figure 13 is a detail view of another switch arm.

Figure 14 is a diagrammatic view of the electrical connections.

Figure 1:
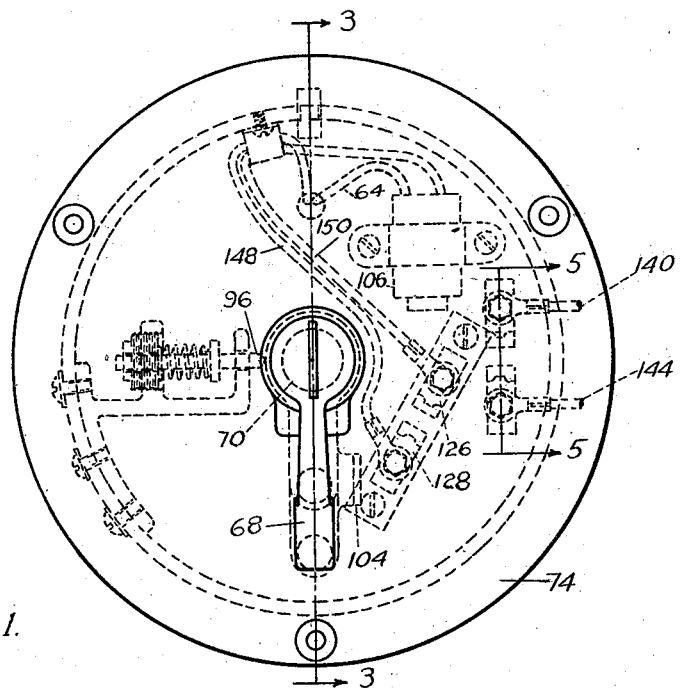
Figure 2:
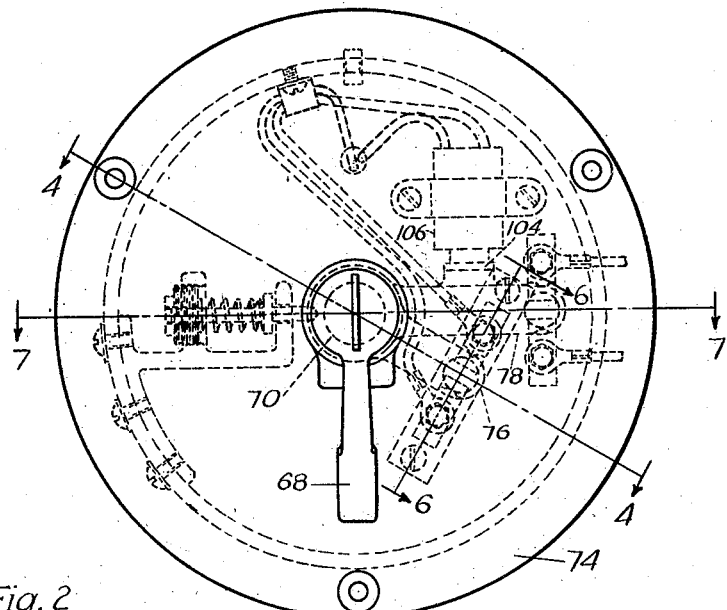
Figure 2 is a front view of the latter with some of the switch members in a different position.

Referring first to Figures 15, 16, 17 and 18, the numeral 10 indicates a change speed gear housing having a gear shift lever 12 rockably mounted on a hollow pedestal 14 and having its lower end adapted to engage the usual gear shift bars. The gear shift lever can be locked in neutral position by a lock 16 in the form of a fork which is mounted to swing and embrace the shift lever. The fork has a trunnion 20 journalled in one side of the pedestal and a trunnion 22 journalled in the other side of the pedestal and serving also as the barrel of a standard lock of which the key is indicated at 24. A coil torsion spring 26 tends to swing the fork upwardly from the dotted line position in Figure 15 to the full line position where it will embrace the shift lever if the latter is in neutral position. If the shift lever is at either side of neutral position, however, it engages the rounded ends of the fork arms and so prevents the fork from swinging upwardly even if permitted by certain other instrumentalities to be described.

One arm of the fork has a hole 30 to receive the rounded end 32 of a slidable plunger 34 which also forms the armature of a magnet 36. The plunger is designed to hold the lock inactive and is pressed to locking position by a coil spring 38. Its movement is limited by a rod 40 having nuts outside the housing. As will later appear, the magnet 36 is energized to withdraw the plunger against the pressure of its spring and thus release the fork. To relock the fork, the key 24 is turned and the fork forced downwardly thereby camming the plunger back against the pressure of its spring until its end snaps into the opening 30.

A casing 42, extending laterally from the pedestal 14, encloses a contact operating mechanism which is controlled by the gear shift lever and the locking fork. This mechanism maintains an ignition circuit closed until the gear shift lever is moved to neutral position even if the ignition switch actuating member is moved to its "off" position. A bar 44 is slidably mounted in the casing with its end projecting into the path of the fork. A coil spring 46, interposed between the casing and an abutment 48 on the bar, presses the bar in such a direction as to force an enlargement 50 on the bar against a wall of the casing. A coned face 52 on the enlargement acts as a cam to depress a spring member 54, when the bar is forced back in the operation of moving the fork to unlocking position. The spring member 54 carries a contact 56 arranged to engage a fixed contact 58 on a plate 60. The plate 60 and spring member 54 are insulated from the casing and connect with wires 62 and 64 which lead to the coil of magnet 36 and to a branch circuit to be described.

Figure 8:
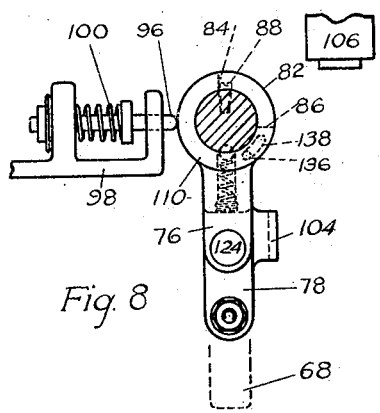
Figure 8 is a detail view of the switch members in the "off" position.
Figure 9:
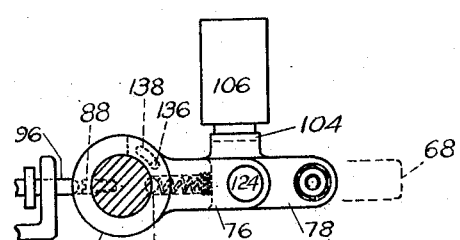
Figure 9 is a detail view of the switch members in the normal "on" position.

Referring to Figures 1 to 13, an ignition switch actuating member 68 is attached to a rock shaft 70 which turns in a housing 72 having a face plate 74. The shaft 70 is held from rotation by pin tumblers 74', operating in the plate 74 and the shaft 70, which tumblers are released by inserting a suitable key 24, in a key-way in the end of the shaft 70. The shaft extends through the hubs of two switch arms 76 and 78 and has lost motion connections therewith. The hub 80 of the longer arm 78 is loose on the shaft and has a peripheral slot 82 with end faces 84 and 86 arranged ninety degrees apart. The slot receives a pin or screw 88 which projects upwardly from the shaft and normally engages the end face 84 when the member 68 extends downwardly in its "off" position as shown in Figure 8. Swinging the member 68 ninety degrees counter-clockwise, as indicated in Figure 9, will swing the switch arm 78 likewise and carry a contact piece 90 on the arm to a position where it will bridge two spring contacts 92 and 94 which are in the ignition circuit. The switch arm 78 is yieldingly latched in this position by a locking pin 96 slidable in a bracket 98 and pressed forwardly by a spring 100 so that its rounded end will ride into the slot 82 and hold the arm by engaging the end face 84 of the slot. A torsion spring 102 connects the shaft 70 and the hub of the arm 78 but in the counter-clockwise movement no change in tension takes place because both ends of the spring move together. The arm 78 also carries a plate or pole piece 104 arranged to contact with an electro-magnet 106 to be retained in a horizontal position thereby when the magnet is energized.

The arm 76 has a hub 110 and an enlargement 112 with a radial bore 114 containing a coil spring 116 which bears at one end against a plug 118 and at its other end against a ball 120 to press the ball into a shallow longitudinal slot 122 in the shaft. The ball acts as a weak connection between the shaft and the arm 76 so that the arm will likewise be lifted when the switch actuating member 68 is swung through its arc of 90°. Arm 76 carries a contact 124 which, under certain conditions, subsequent to those recited, will bridge two spring contacts 126 and 128 in a branch circuit to be described but, in the upward movement recited, the contact 124 clears or escapes the contacts 126 and 128. A coiled compression spring 130 holds the arm 76 pressed towards the arm 78 but, in the return movement of arm 76 alone, the arm 76 is moved along the shaft 70, by means to be described, against the pressure of the spring 130, and contact 124 closes contacts 126 and 128. These devices comprise a cam face 132 on the hub 110 and a corresponding cam face 134 on the hub 80.

Figure 10:
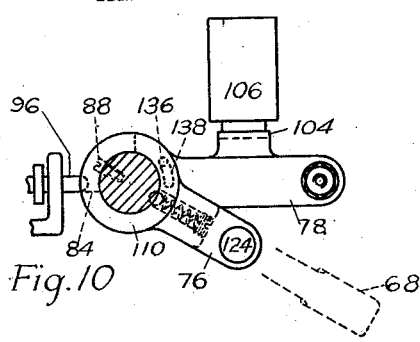
Figure 10 is a detail view of the switch members with the switch actuating member partly turned back to the "off" position.
Figure 11:
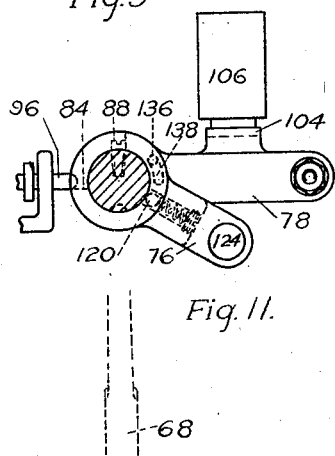
Figure 11 is a detail view with the switch actuating member turned way back to the "off" position.
Figure 7:
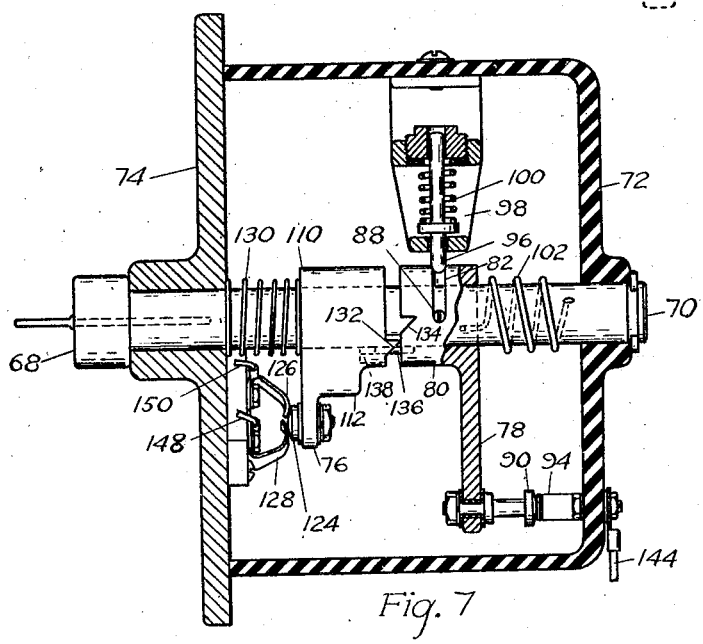
Figure 7 is a horizontal section on the line 7—7 of Figure 2.

When the ignition switch actuating member 68 is moved clockwise from the position of Figure 9 to that of Figure 10, the arm 78 is held stationary by the locking pin 96 but the ball connection 120 between the arm 76 and the shaft is effective to turn the arm 76 with the shaft. The relative angular movement of the switch arms 76 and 78 causes the cam faces 132 and 134 to force the arm 76 along the shaft by compressing spring 130. This separates the arms so that the contact 76 reaches the plane of contacts 126 and 128. A pin 136 in the end of hub 80 projects into a slot 138 of hub 110 and limits this relative angular turning movement to an arc of about 30°. Hence, when the switch member 68 is turned down to the off position of Figure 11, the arm 76 remains in the Figure 10 position to complete the branch circuit through the contacts 126, and 128 and through the coil of the magnet 106. The magnet supplements the holding power of locking pin 96 so that the ball 120 will be forced out of its shallow slot 122 in the shaft to permit this independent return of the switch member 68. The pull of the magnet also counteracts the increasing tension in the spring 102 which is caused by the turning of the shaft. When the magnet 106 is subsequently de-energized, under control of the gear shift lever and lock, the energy stored in the torsion spring 102 will return all the switch arms to the original or "off" position of Figure 8. Under these conditions the locking pin 96, having no help from the magnet, is forced out of the slot 82 to release the arm 78.

Referring to the diagram of Figure 14, the contact 92 is connected by a wire 140 to a spark coil and a timer 142 and the contact 94 is connected by wire 144 to a battery 146. The timer and battery being grounded, the bridging of contacts 92 and 94 renders the ignition current effective. A branch wire 148 extends from the battery to the contact 128 and a wire 150 extends from contact 126 to the coil of magnet 106. The magnet coil is connected by the wire 64 to fixed contact 58 and the coil of magnet 36 in the gear casing is grounded. Thus, when contacts 56 and 58 are held together, as when the gear shift lever is out of neutral, and contacts 126 and 128 are bridged by contact 124, carried by the arm 76, the branch circuit is held closed after the switch actuating member 68 is moved to its off position.

Figure 15:
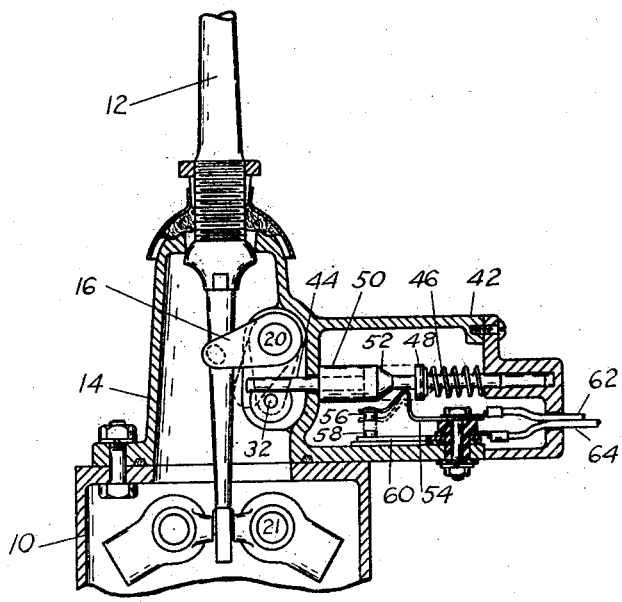
Figure 15 is a vertical section of mechanism associated with a change speed gear housing.
Figure 16:
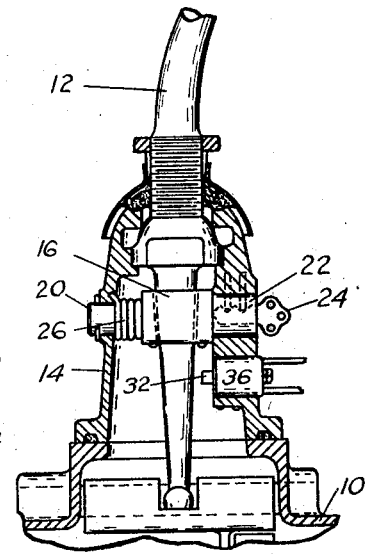
Figure 16 is a vertical section at right angles to Figure 15.
Figure 17:
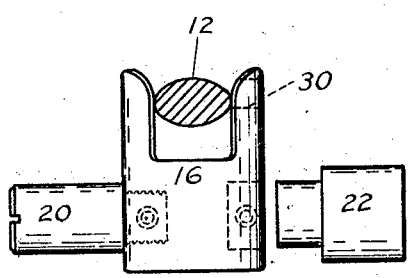
Figure 17 is a detail view of the locking fork.
Figure 18:
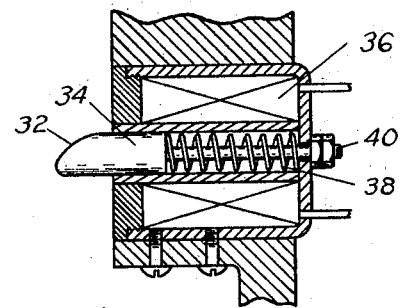
Figure 18 is a detail view, in section, of the fork holding plunger and its magnet.

Assuming the switch actuating member 68 is in the off position of Figure 8 and the shift lever locked as shown in Figure 15, the operator, with the key 24, turns the fork 16 downwardly thereby forcing the bar 44 longitudinally and camming the plunger 34 inwardly until it snaps into the hole 30 to hold the fork in unlocking position. The movement of bar 44 causes the coned cam 52 to force down the spring member 54 and unite the contacts 56 and 58. This renders the branch circuit ready for action whenever the contacts 126 and 128 are bridged. The switch actuating member and switch arms are turned to the Figure 9 position where the regular ignition circuit is effective. When the switch actuating member 68 is returned to the "off" position again and the shift lever brought to neutral position, the bridging of contacts 126 and 128 by the arm 76 energizes the magnet 36 and withdraws the plunger 34 and releases the locking fork which automatically locks the shift lever. If, however, the operator does not shift to neutral, the locking fork cannot move to locking position, the contacts 56 and 58 are kept together and hence the magnet 106 is energized through the branch circuit to hold the arm 78 in its upper position where it continues to bridge the contacts 92 and 94 and maintain the ignition circuit closed with the engine running. To stop the motor, the operator must therefore move the shift lever out of gear, or to neutral position, so that the branch circuit will be broken. The same act automatically locks the shift lever. Thus locking of the vehicle is assured and the motor will not subsequently be inadvertently started while in gear. On those occasions when it is desired to leave the motor in gear, as on a hill, this can be deliberately done by unlocking the shift lever without however turning on the ignition.

Although the invention has been described by reference to a specific construction, it should be understood that, in its broader aspects, it is not necessarily limited to the form selected for mere illustrative purposes.

I claim:

1. In apparatus of the character described, an ignition circuit having a switch actuating member movable to on and off positions, in combination with mechanism for holding the circuit closed after the switch actuating member has been moved to its off position.

2. In apparatus of the character described, in combination, an ignition circuit having a switch actuating member movable to on and off positions, a gear shift lever, and mechanism controlled by the gear shift lever for holding the circuit closed after the switch actuating member has been moved to its off position.

3. In apparatus of the character described, in combination, an ignition circuit having a switch actuating member movable to on and off positions, a gear shift lever, and means operated by the movement of the gear shift lever to neutral position for breaking the ignition circuit.

4. In apparatus of the character described, in combination, an ignition circuit having a switch actuating member movable to on and off positions, a gear shift lever, mechanism for holding the circuit closed after the switch actuating member has been moved to its off position, and means actuated by the movement of the gear shift lever to neutral position for breaking said ignition circuit.

5. In apparatus of the character described, in combination, an ignition circuit having a switch actuating member movable to on and off positions, a gear shift lever, and a branch circuit, closed by the operation of moving the switch actuating member to its off position, for maintaining the ignition circuit closed until the gear shift lever is moved to its neutral position.

6. In apparatus of the character described, in combination, an ignition circuit having a switch actuating member movable to on and off positions, a gear shift lever, a branch circuit closed by the operation of moving the switch actuating member to its off position, and comprising electro-magnetic means for maintaining the ignition circuit closed until the gear shift lever is moved to its neutral position.

7. In apparatus of the character described in combination, an ignition circuit having a switch actuating member movable to on and off positions, a gear shift lever, electro-magnetic means for maintaining the ignition circuit closed after the switch actuating member has been moved to its off position, and a lock for the gear shift lever controlling said electro-magnetic means.

8. In apparatus of the character described, in combination, an ignition circuit having a switch actuating member movable to on and off positions, a gear shift lever, a lock for the gear shift lever, means to hold the lock inactive, electro-magnetic means for maintaining the ignition circuit closed and for releasing the lock holding means when the switch actuating member is moved to its off position.

9. In apparatus of the character described, in combination, a gear shift lever, a lock for the gear shift lever, means for holding the lock inactive, an ignition circuit, a switch actuating member movable to on and off positions, a branch circuit having an electro-magnet to release the holding means, said branch circuit being closed in the movement of the switch actuating member to off position, and means for maintaining both said circuits closed until the lock moves to locking position.

10. In apparatus of the character described, in combination, a gear shift lever, a lock for the gear shift lever, means for holding the lock inactive, an ignition circuit, a switch actuating member movable to on and off positions, an electro-magnet to release the holding means, a branch circuit for energizing the magnet, and a contact member in said circuit operated by movement of the lock to locking position for breaking said circuit.

11. In apparatus of the character described, in combination, a gear shift lever, a lock for the gear shift lever, means for holding the lock inactive, an ignition circuit, a switch actuating member movable to on and off positions, and a branch circuit having an electro-magnet to release the holding means and an electro-magnet to maintain the ignition circuit closed after the switch actuating member is moved to its off position.

12. In a motor vehicle, in combination, a transmission, means for locking the transmission in one of its positions, a motor controlling device normally operable independently of said locking means, and interlocking means between said device and locking means for rendering said device inoperative when the transmission is out of locking position.

13. In a motor vehicle, in combination, a transmission, a gear shift lever for the transmission, an ignition switch normally manually operable independently of said gear shift lever and transmission, and interlocking means between said lever and switch for rendering said switch inoperative to break the circuit when said gear shift lever is in gear position.

14. In combination, a transmission, means for locking the transmission in one of its positions, a motor control device manually operable independently of said locking means to start and stop the motor, and interlocking means between the control device and the transmission for rendering the control device inoperative to stop the motor when the transmission is out of locking position.

In testimony whereof I affix my signature.

FRANCIS D. HARDESTY.